Patented Sept. 8, 1936

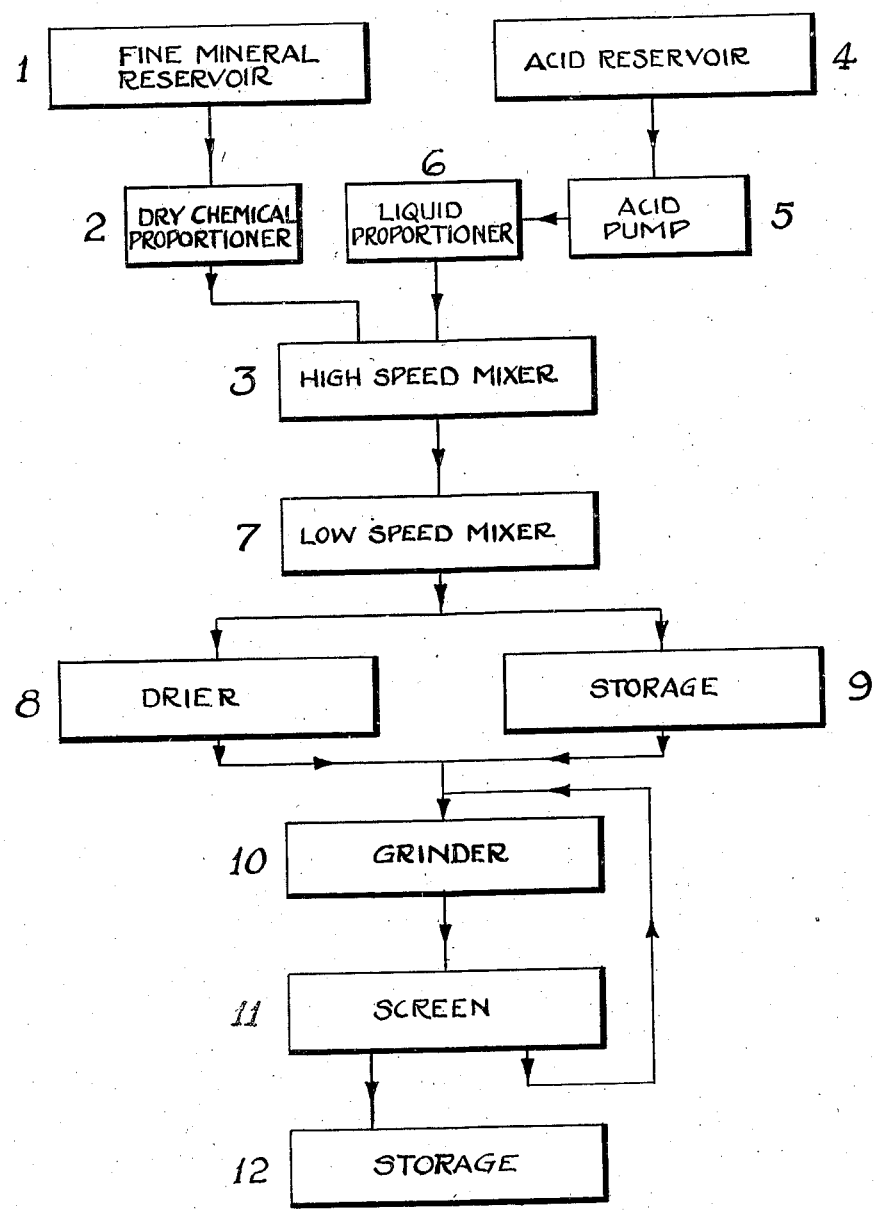

2,053,266

UNITED STATES PATENT OFFICE 2,053,266

MANUFACTURE OF CALCIUM PHOSPHATES

Harry A. Curtis, Knoxville, Tenn., assignor to Tennessee Valley Authority, Wilson Dam, Ala., a corporation of the United States Application May 21, 1934, Serial No. 726,757

5 Claims. (Cl. 23—109)

(Granted under the act of March 3, 1883, as amended April 30, 1928; 370 O. G. 757)

This invention relates to the process of and the apparatus for the manufacture of products obtained from the reaction of finely divided solid chemical materials with concentrated mineral acids; and particularly to the manufacture of mono- and di-calcium phosphates from limestone and phosphoric acid.

This application is made under the act of April 30, 1928, and the invention herein described, if patented, may be manufactured and used by or for the Government for governmental purposes without the payment to me of any royalty thereon.

One of the objects of my invention is the provision for a semi-continuous or continuous process for the reaction of fine chemical materials with concentrated mineral acids, which may result in a substantially complete combination to form a fine, dry product. Another object of this invention is a process of manufacture for concentrated fertilizers or concentrated fertilizer ingredients.

Calcium phosphates, known commercially as superphosphates, have been generally made by the action of diluted sulfuric acid, or diluted phosphoric acid, upon ground phosphate rock. It has been generally considered that, in the first instance, a more satisfactory combination of reactants was obtained when the diluted sulfuric acid was used and that, in the second instance, it was not possible to use phosphoric acid for fertilizer manufacture in concentrations exceeding 60% $H_3PO_4$, which necessitated the use of the diluted phosphoric acid. In either case, the initial mixture of partially reacted material of semi-fluid consistency is required to pass to the curing operation where it sets up into an integral, concrete mass. The reaction mixtures have contained such an excess of water derived from the diluted acid used that it has been necessary to provide sufficient time in storage to effect evaporation of the retained water or to subject the mixtures to an expensive drying step for a low value product before the final grinding could be completed.

I have found that, by rapidly mixing fine limestone and concentrated phosphoric acid, the initial mixture of partially reacted material may be agglomerated into small, discrete pieces, which may be conveyed away slowly, with or without gentle mixing, until the reaction is substantially complete. The partially reacted material may also be agglomerated into thin layered masses, which may be conveyed away slowly until the reaction is substantially complete and then broken into small discrete pieces as it leaves the conveyor. Heating the agglomerated material shortens the time required for the completion of the reaction in certain instances so that the subsequent grinding step may be carried out promptly.

Some reactions involved in the manufacture of calcium phosphates by steps within the scope of this invention are presented: using limestone and phosphoric acid in such proportions as to form mono-calcium phosphate, $$CaCO_3 + 2H_3PO_4 = CaH_4(PO_4)_2 \cdot H_2O + CO_2$$

using limestone and phosphoric acid in such proportions as to form di-calcium phosphate, $$CaCO_3 + H_3PO_4 + H_2O = CaHPO_4 \cdot 2H_2O + CO_2$$

and using phosphate rock with phosphoric acid and sulfuric acid to form mono-calcium phosphate, $$Ca_3(PO_4)_3 + 4H_3PO_4 + 3H_2O = 3CaH_4(PO_4)_2 \cdot H_2O$$

$$Ca_3(PO_4)_2 + 2H_2SO_4 + 5H_2O = CaH_4(PO_4)_2 \cdot H_2O + 2CaSO_4 \cdot 2H_2O$$

magnesian limestone, which is dolomitic limestone with 5 to 18% magnesium carbonate, and dolomite react with phosphoric acid to form mixed calcium magnesium phosphates.

A diagrammatic representation of one form of apparatus for the embodiment of my process is shown in the accompanying drawing. The fine mineral reservoir 1, is arranged to feed the dry chemical proportioner 2, which supplies one portion of the charge to the high speed mixer 3. The acid reservoir 4, is connected with the intake of acid pump 5, which discharges to the liquid proportioner 6, supplying the other portion of the charge to the high speed mixer 3. The high speed mixer 3, discharges into the low speed mixer 7, which discharges either into drier 8, or into storage 9. The discharge from drier 8, or stock from storage 9, is conveyed to grinder 10, and onto the screen 11. The material not passing through the screen 12, is returned to the grinder and the finished product passing through screen 11, is conveyed to storage 12.

One example of the operation of my process is given for the manufacture of mono-calcium phosphate from limestone and phosphoric acid: 50 mesh limestone was fed at the rate of 190 pounds per hour along with 83% phosphoric acid at the rate of 364 pounds of $H_3PO_4$ per hour into a high speed mixer operating at 150 R. P. M. The partially reacted mixture, while still fluid, was discharged into a low speed mixer operating at 40

R. P. M. from which it was delivered to storage in the form of small lumps. This material was subsequently ground in a hammer mill to pass through a 10 mesh screen.

Another example of the functioning of my process is shown for the manufacture of di-calcium phosphate from limestone and phosphoric acid: 100 mesh limestone was fed at the rate of 239 pounds per hour along with 70% phosphoric acid at the rate of 233 pounds of $H_3PO_4$ per hour into the high speed mixer operating at 150 R. P. M. The partially reacted mixture was discharged as a pasty mass into the low speed mixer operating at 40 R. P. M. from which it was delivered into storage in a lumpy condition. This material was subsequently dried and then ground in a hammer mill to pass through a 10 mesh screen.

An additional example is given for the manufacture of mono-calcium phosphate from phosphate rock and phosphoric acid: 100 mesh phosphate rock was fed at the rate of 232 pounds per hour along with 75% phosphoric acid at the rate of 226 pounds of $H_3PO_4$ per hour into a two-shaft mixer, one shaft with 25 blades, each blade set 180° from adjoining blade, operating at 48 R. P. M. and the other shaft with 25 blades, each blade set 120° from adjoining blade, operating at 72 R. P. M. and in opposite direction to the first shaft. The partially reacted mixture was discharged from the mixer in a lumpy condition into a steam heated rotary drier, which moved at the rate of 2 R. P. M. and conveyed to storage. This material was then ground in a hammer mill to pass through a 10 mesh screen.

It will therefore be seen that this invention may be actually carried out by the modification of certain details without departing from its spirit or scope. Some of the means and apparatus for obtaining the desired result include, the mixing of reactants in a relatively high speed mixer followed by mixing in a relatively low speed mixer; the mixing of reactants in a relatively high speed mixer followed by mixing in a relatively low speed mixer in the form of a rotary drier; and mixing in a relatively high speed mixed followed by very slowly conveying away the mixture in a relatively thin layer.

Certain terms used throughout the description and claims are understood to have the following meaning: solid chemical materials refer to crude materials, such as minerals, and materials of high as well as of intermediate states of purity; concentrated acid refers to strong but not necessarily anhydrous material with the concentrations being in excess of 65%; and relatively high speed and the relatively low speed of the mixers, driers or conveyors refers to the relative speed of the units working in cooperation, while, of course, the actual speeds will depend upon the capacity and design of the cooperating units.

I claim:

1. Process of treating limestone with concentrated phosphoric acid which comprises contacting continuously the fine limestone and the concentrated phosphoric acid in a paddle type mixer, operated at a sufficiently high speed to insure a thorough mixing of the charge while in a fluid condition and for the duration of the apparent fluidity of the mixture; continuing the mixing of the mixture after the fluid state has passed in a second paddle type mixer, operating at a substantially lower speed than the first mixer, until the plastic mixture breaks up into agglomerated masses; heating the agglomerated masses until the chemical reaction between the constituents of the charge is substantially complete; and grinding the agglomerated masses after the heating.

2. Process of treating phosphate rock with concentrated phosphoric acid which comprises, contacting continuously the fine phosphate rock and the concentrated phosphoric acid in a paddle type mixer, operated at a sufficiently high speed to insure a thorough mixing of the charge while in a fluid condition and for the duration of the apparent fluidity of the mixture; continuing the mixing of the mixture after the fluid state has passed in a second paddle type mixer, operating at a substantially lower speed than the first mixer, until the plastic mixture breaks up into agglomerated masses; heating the agglomerated masses until the chemical reaction between the constituents of the charge is substantially complete; and grinding the agglomerated masses after the heating.

3. Process of treating dolomite with concentrated phosphoric acid which comprises contacting continuously the fine dolomite and the concentrated phosphoric acid in a paddle type mixer, operated at a sufficiently high speed to insure a thorough mixing of the charge while in a fluid condition and for the duration of the apparent fluidity of the mixture; continuing the mixing of the mixture after the fluid state has passed in a second paddle type mixer, operating at a substantially lower speed than the first mixer, until the plastic mixture breaks up into agglomerated masses; heating the agglomerated masses until the chemical reaction between the constituents of the charge is substantially complete; and grinding the agglomerated masses after the heating.

4. Process of treating a calcium compound, reactive with concentrated phosphoric acid to form a phosphatic product substantially free from salts of other acids, with concentrated phosphoric acid which comprises contacting continuously the fine calcium compound and the concentrated phosphoric acid in a paddle type mixer, operated at a sufficiently high speed to insure a thorough mixing of the charge while in a fluid condition and for the duration of the apparent fluidity of the mixture; continuing the mixing of the mixture after the fluid state has passed in a second paddle type mixer, operating at a substantially lower speed than the first mixer, until the plastic mixture breaks up into agglomerated masses; heating the agglomerated masses until the chemical reaction between the constituents of the charge is substantially complete; and grinding the agglomerated masses after the heating.

5. Steps in the process of treating a calcium compound, reactive with concentrated phosphoric acid to form phosphates, and the concentrated phosphoric acid which comprises contacting continuously the calcium compound and the concentrated phosphoric acid in a paddle type mixer, operated at a sufficiently high speed to insure a thorough mixing of the charge while in a fluid condition and for the duration of the apparent fluidity of the mixture; and continuing the mixing of the mixture after the fluid state has passed in a second paddle type mixer, operating at a substantially lower speed than the first mixer, until the plastic mixture breaks up into agglomerated masses.

HARRY A. CURTIS.